United States Patent

[11] 3,610,868

| [72] | Inventors | Wilhelm Mantel<br>Munich;<br>Marjan Mursic, Lohhof; Anton Buchmeier,<br>Lohhof, all of Germany |
|---|---|---|
| [21] | Appl. No. | 884,265 |
| [22] | Filed | Dec. 11, 1969 |
| [45] | Patented | Oct. 5, 1971 |
| [73] | Assignee | Linde Aktiengesellschaft<br>Wiesbaden, Germany |
| [32] | Priority | Dec. 12, 1968 |
| [33] | | Germany |
| [31] | | P 18 14 325.4 |

| [54] | SUBMERGED-WELDING METHOD<br>5 Claims, 1 Drawing Fig. | |
|---|---|---|
| [52] | U.S. Cl. | 219/73 |
| [51] | Int. Cl. | B23k 9/18,<br>B23k 25/00 |
| [50] | Field of Search | 219/73, 72 |

[56] References Cited
UNITED STATES PATENTS

| 3,296,412 | 1/1967 | Waite et al. | 219/73 X |
| 3,456,089 | 7/1969 | Shrubsall | 219/73 |
| 3,467,808 | 9/1969 | Dewez, Jr. et al. | 219/73 |

Primary Examiner—J. V. Truhe
Assistant Examiner—Lawrence A. Rouse
Attorney—Karl F. Ross ABSTRACT: A submerged-arc-welding method using a bare metal welding electrode at high speeds and currents above 1,000 amperes in which the voltage across the arc is held sufficiently small to eliminate the positive column of the welding arc which then consists only of anode fall or drop and cathode fall or drop. The voltage is established between 22 and 24 volts with currents of 1,000 to 4,000 amperes and weld wire thicknesses of 6 to 8 mm. are used when the current is between 1,500 and 2,500 amperes but above 7.0 mm. with currents above 2,500 amperes.

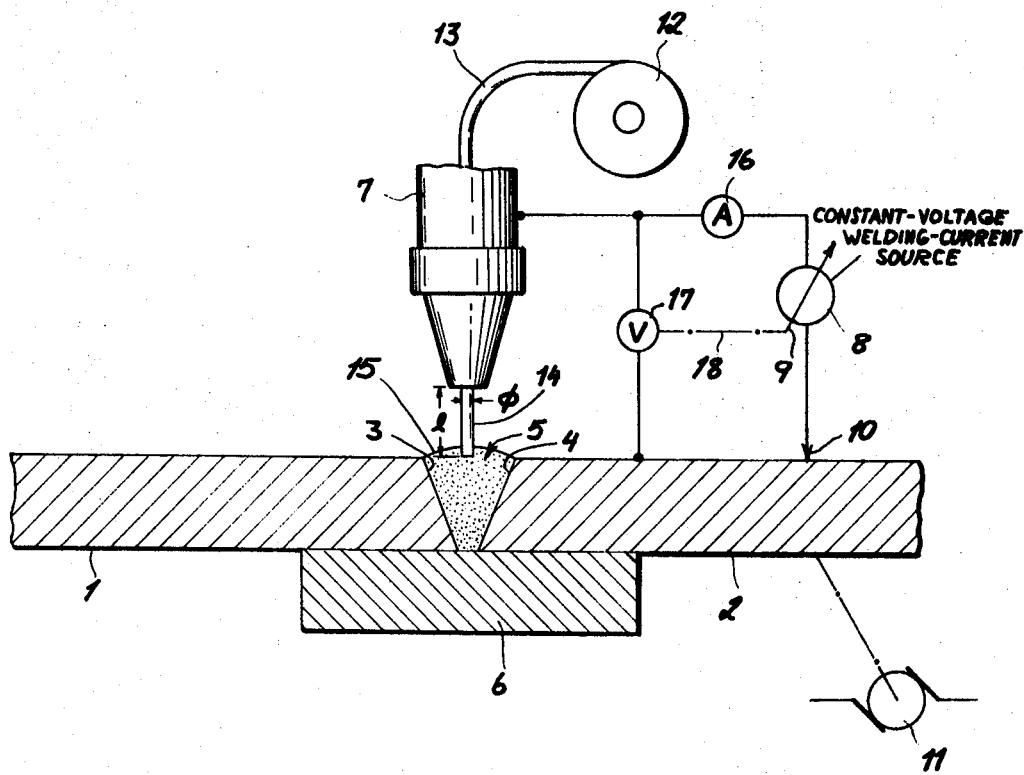
Wilhelm Mantel
Marjan Mursic
Anton Buchmeier
INVENTORS.
BY
Karl F. Ross
Attorney

SUBMERGED-WELDING METHOD

Our present invention relates to submerged-arc welding using bare metal welding wire electrodes at high speeds and in which the welding arc is submerged by a blanket of granular fusible flux and, more particularly, to improvements in submerged-arc-welding techniques.

In submerged-arc welding, the heat of an electric arc struck between a bare metal electrode wire and the workpiece serves to melt the welding wire and deposit the weld material in a bead or seam of weldment generally in a welding gap of wedge-shaped or straight-sided configuration.

The weld and the arc are shielded by a blanket of granular fusible material generally constituting a "flux" which chemically reacts with oxidized metal to improve the bond between the deposited weldment and the base metal of the workpiece. The blanket of granular material, by virtue of its enclosure of the arc and the weld site, constitutes a shield preventing oxidation in the course of welding and, therefore, "submerges" the arc and the welding site to render them invisible.

In general, submerged-arc welding can be carried out with relatively slender electrodes at low currents and voltages at relatively fast speeds in terms of the relative movement of the electrode and the workpiece. However, when high speeds are desired for relatively thick metals using large-diameter welding wire to compensate for high currents, voltages above 30 volts must be employed as will be apparent hereinafter.

In general terms, however, it can be said that it is not simply sufficient to increase the welding speed, i.e. the rate at which the workpiece moves with respect to a fixed welding position or the rate at which the welding head is displaced relative to a fixed workpiece, inasmuch as increased speed gives rise to insufficient penetration of the welding heat and insufficient fusion of the weld material with the base metal.

It is important in substantially all welding techniques to obtain as effective heating at the interface of the base metal and the weld material as is possible, subject, of course, to the limitation that the base metal should not be damaged, in order to effect a maximum degree of alloying, mutual dissolution or mutual diffusion of the weld metal and the base metal at the interface.

As the rate of advance of the movable member of the welding system, i.e. speed of the wire-carrying head or the speed of the workpiece, increases, it is necessary to augment the welding current amplitude correspondingly to maintain the same heat or degree of heating of the workpiece. It has been found, however, that with submerged-arc-welding techniques, in which the arc passes through a bed of granular flux using a single welding wire electrode, current limitations are encountered and it is not practically possible to increase the speed and current compensatorily.

Investigations have been made into other methods of increasing the welding speed. Thus, for example, it has been proposed to provide so-called "tandem" welding methods in which two or more wire electrodes in close juxtaposition are arranged one behind the other over a welding gap, i.e. the groove or channel formed between two workpieces to be joined by welding. As has been noted earlier, the flanks of this groove may converge toward one another or may be parallel to one another, may be straight or curvilinear, depending upon the nature of the weld seam which is desired.

The tandem technique, however, is designed primarily to widen the weld seam and degas the pool of molten weldment as it is formed, thereby allowing an increase in the relative speed of the workpiece of the welding head at the same current amplitude to, for example, three times the speed which can be sustained by a single-wire electrode with similar current and under otherwise parallel conditions. However, the electric power utilization or efficiency is proportionately diminished and there is an increased consumption of weld metal from the additional wires.

In general terms, moreover, it has been found that submerged-arc welding with a given weld powder (flux) and given arc parameters, is characterized by a well-defined maximum welding speed, such that defects begin to appear when the speed is increased beyond this maximum. The defects are generally in the form of notches, grooves or depressions at the edge of the weld seam (i.e. groove). Consequently, it has long been desired to provide increased welding speeds for defect-free welds of high-power economy.

It is, therefore, an important object of this invention to provide an improved submerged-arc-welding method in which the aforementioned disadvantages can be obviated and high-quality welds formed at relatively high welding speeds.

A more specific object of the invention is the provision of an improved submerged-arc-welding method operating at currents above 1,000 amperes with speeds higher than those which have been obtainable heretofore.

It is another object of this invention to provide an improved welding method using submerged-arc techniques for high-power operation such that the disadvantages of the prior art tandem methods are obviated.

We have discovered, most surprisingly, that it is possible to carry out submerged-arc welding with increased welding speeds and at relatively high welding currents, i.e. currents above 1,000 amperes, using bare metal welding wire electrodes and a blanket of a flux powder, when the characteristics of the electric arc are modified as will be apparent hereinafter.

It has been recognized that the electric arc of a welding system comprises three major portions, namely, the cathode fall or drop, a positive column and the anode fall or drop. In the region of the cathode fall and the anode fall, the potential drop per unit length of the electric arc is proportionately large whereas, in the region of the positive column, the potential drop is relatively small. We have discovered that the potential drop of the cathode-fall and the anode-fall portions of the arc together lies between 21 and 22 volts, inclusive, and is a value having little dependency upon the amplitude of the welding current and substantially all of the other welding parameters. Furthermore, we have found to our great surprise that qualitatively increased speeds of submerged-arc welding can be obtained when the voltage between the wire electrode and the workpiece is so adjusted that the positive column of the arc is minimized or eliminated and thus when the voltage of the arc is held as close to about 22 volts as possible. Under these circumstances, the positive column of the arc is practically completely eliminated so that the arc consists substantially exclusively of the cathode-fall and the anode-fall portions mentioned earlier.

It has been observed that the value of the voltage drop across the electric arc, then consisting of the cathode-fall and anode-fall portions substantially exclusively, is also dependent, to a very slight degree only, upon the welding current amplitude. Hence an important feature of this invention resides in providing a voltage between the wire electrode and the workpiece which is set in accordance with the welding current amplitude in the range between 22 and 24 volts with a higher voltage portion of this range being selected as the current amplitude is increased.

The invention is intended to apply to submerged-arc welding using currents above 1,000 amperes and increases the welding speed to a level, with a single-wire electrode and a single arc, not hitherto attainable. This is totally unexpected from the knowledge of submerged-arc welding as it has been developed heretofore. For example, submerged-arc welding at currents above 1,000 amperes has hitherto invariably been carried out at voltages above 30 volts in the belief that crack-free welds are avoided only by the use of such high voltages. Almost invariably it has been the practice to associate increased welding speeds with increased voltages and it is not uncommon, as the welding current increases from 1,000 amperes to, say, 2,000 amperes, to associate therewith arc voltages of 30 volts to 43 volts with the higher currents being used in conjunction with the higher voltages.

It is thus indeed surprising that a sharp drop in the voltage to the level of 22 to 24 volts, as provided in accordance with the present invention, can allow still higher speeds at higher currents. It is interesting to note that an increase in the voltage from the upper limit contemplated in accordance with the present invention by 2 volts or less than 10 percent, produces a weld having significant edge grooving, whereas an increase of about 4 volts above the upper limit renders the weld totally unusable because of the edge grooving. In practice, it is found that arc voltages below 30 volts and above the range of 22 to 24 volts of the present invention, give rise to a positive column in the electric arc which obviates the use of such arc voltages in submerged-arc welding almost completely. In other words, the art has long concentrated on arc voltages above 30 volts for high-current submerged-arc welding and it has now been surprisingly found that a very narrow range of voltages well below the minimum heretofore considered useful, may be employed for high-current welding with augmented welding speeds.

According to a further feature of this invention, the welding current of 1,500 to 2,500 amperes is used with a welding wire having a diameter of 6 to 8 mm.

We have found that it is possible to maintain well-defined edge characteristics of the well by appropriate choice of the diameters of the cylindrical welding wire which preferably ranges between 6 mm. and 8 mm., providing that the welding current is chosen correspondingly within the range of 1,500 to 2,500 amperes mentioned above. With greater welding current amplitudes, i.e. above 2,500 amperes, it is important to make use of weld wire with a diameter above 7.0 mm. Also the length of the free end of the welding wire electrode has been found to be significant, this length being measured between the electrode tip and the location at which current is supplied to the electrode. The length of the free end of the welding wire has an influence upon the quality of the resulting weld seam and should, in accordance with this feature of the invention, be less than 35 mm.

We have also found that, in the practice of the instant method, a weld current source should be used which has a horizontal or approximately horizontal characteristic and is preferably a so-called "constant voltage" current source. In this case, a control of the wire feed in accordance with the current or voltage characteristics is not necessary.

The invention is described in greater detail below, reference being made to the accompanying drawing in which the sole FIGURE is a diagrammatic cross section of the welding site illustrating the invention.

In the drawing, we show a pair of metal plates 1, 2, the adjoining edges of which have been bevelled at 3, 4 to produce a welding groove generally designated at 5 and of V-section. A backing plate 6 underlies this groove while a welding head 7 is positioned in the vertical median plane of the groove. The head 7 is connected to one terminal of a constant voltage welding current source 8 which is adjustable as represented by the arrow 9 and has its other terminal connected at 10 to the workpieces 1, 2. The latter are displaced relatively to the welding head upon a carriage (not shown) by a motor 11 of conventional type.

A reel 12 supplies bare metal welding wire 13 to the head 7 such that a free end 14 of the welding wire emerges from this head. The arc struck by the end 14 of the welding wire and the workpieces 1, 2, is submerged in a bead 15 of flux powder. The diameter Φ of the electrode wire 13, 14 ranges between 6 and 8 mm. according to the present invention while the free length $l$ is less than 35 mm. The welding current, measured by an ammeter 16 in series with the welding current source 8 is designed to indicate a current between 1,000 and 4,000 amperes whereas a voltage-responsive meter can be connected across the electrode and workpiece gap to indicate the arc voltage (22 to 24 volts), and to control the welding current source as represented by the dot-dash line 18 to maintain this voltage. Submerged-arc welding can thus be carried out in the otherwise conventional manner at relatively high rates as indicated by the following specific examples:

EXAMPLE I

Two steel plates, positioned as indicated in the drawing, are welded together with a weld wire having diameter Φ of 6 mm., a free length $l$ of 30 mm. to form a weld seam with a width of 7.5 mm. and a height of 3.5 mm. Conventional flux powder was used and the welding was carried out at 2,000 amperes with an arc voltage of 22 volts. The welding speed could be maintained at 300 cm./minute to yield a well-formed weld bead free from edge grooves and other defects.

EXAMPLE II

The system of example I was used except that a weld wire with a diameter of 8 mm., a current of 3,000 amperes and an arc voltage of 23 volts were employed. The weld bead had a width of 11 mm. and a height of 2.5 mm. with a speed of 300 cm./minute.

From the foregoing examples, it is evident that increasing current amplitude gives rise to increasing width of the weld bead, but a decreasing height. Both weld beads were free from defects.

The invention as described is believed to admit of many modifications within the ability of those skilled in the art and, for example, is compatible with the system described and claimed in the commonly assigned copending U.S. Pat. application Ser. No. 690,127, filed Dec. 13, 1967. All such modifications will be readily apparent to the skilled in the art and are intended to be included within the spirit and scope of the appended claims.

We claim:

1. In a method of submerged-arc welding of a metal workpiece wherein an electric arc is struck between a bare metal welding wire electrode through a blanket of powder shielding the arc, the improvement wherein the welding current is maintained between 1,000 and 4,000 amperes and the arc voltage is maintained between substantially 22 and 24 volts, the higher voltages corresponding to the higher currents within the indicated ranges, and the arc voltage is adjusted to eliminate the positive column of the electric arc so that said arc consists substantially exclusively of a cathode-fall zone and an anode-fall zone.

2. The improvement defined in claim 1 wherein the welding current is in excess of 2,500 amperes and said welding wire has a diameter of at least 7.0 mm.

3. The improvement defined in claim 1 wherein said welding current ranges between 1,500 and 2,500 amperes and said welding wire has a diameter between 6 and 8 mm.

4. The improvement defined in claim 1 wherein said welding wire is connected to a welding current source at a location spaced from its tip, said welding wire having a free end between said location and said tip of a length less than of about 35 mm.

5. The improvement defined in claim 1 wherein a constant voltage welding current source with a substantially horizontal voltage current characteristic is connected across said welding wire and said workpiece.